United States Patent
Enomoto et al.

(10) Patent No.: US 7,296,742 B2
(45) Date of Patent: Nov. 20, 2007

(54) DATA PROCESSING APPARATUS, DATA PROCESSING METHOD, AND PORTABLE COMMUNICATION TERMINAL APPARATUS

(75) Inventors: Kazuyoshi Enomoto, Tokyo (JP); Atsuo Yoneda, Kanagawa (JP)

(73) Assignee: FeliCa Networks, Inc. (JP)

( * ) Notice: Subject to any disclaimer, the term of this patent is extended or adjusted under 35 U.S.C. 154(b) by 28 days.

(21) Appl. No.: 11/155,499

(22) Filed: Jun. 20, 2005

(65) Prior Publication Data

US 2005/0284940 A1   Dec. 29, 2005

(30) Foreign Application Priority Data

Jun. 29, 2004  (JP)  ............................. 2004-190795

(51) Int. Cl.
- G06K 19/06 (2006.01)
- G06K 7/08 (2006.01)
- H04M 1/00 (2006.01)
- G08B 13/14 (2006.01)

(52) U.S. Cl. .................... 235/451; 235/492; 340/572.7; 455/550.1

(58) Field of Classification Search ................. 235/492, 235/439, 382, 380, 382.5, 487, 491, 441, 235/488, 479, 480, 375, 435, 451; 700/50; 340/572, 539.1, 539.17, 541, 507, 572.1–8; 331/74; 455/550, 552.1, 131

See application file for complete search history.

(56) References Cited

U.S. PATENT DOCUMENTS

| 6,168,083 | B1 * | 1/2001 | Berger et al. ............... 235/492 |
| 6,173,899 | B1 * | 1/2001 | Rozin ........................ 235/492 |
| 6,700,491 | B2 * | 3/2004 | Shafer ..................... 340/572.7 |
| 6,886,753 | B2 * | 5/2005 | Azuma ....................... 235/492 |
| 6,888,459 | B2 * | 5/2005 | Stilp .......................... 340/541 |
| 2004/0204022 | A1 * | 10/2004 | Ito et al. ................... 455/550.1 |
| 2005/0049729 | A1 * | 3/2005 | Culbert et al. ................ 700/50 |
| 2006/0151614 | A1 * | 7/2006 | Nishizawa et al. ......... 235/492 |
| 2006/0152293 | A1 * | 7/2006 | McCorquodale et al. ..... 331/74 |

FOREIGN PATENT DOCUMENTS

JP   2003-036427   2/2003

* cited by examiner

Primary Examiner—Michael G. Lee
Assistant Examiner—Thien T Mai
(74) Attorney, Agent, or Firm—Rader Fishman & Grauer PLLC

(57) ABSTRACT

A data processing apparatus adapted to receive power to operate a clock generator from a first power supply, such as a radio signal transmitter, or a second power supply, such as an internal power supply for a portable communication device. The data processing apparatus is configured to use a lower clock frequency when drawing power from the radio signal transmitter, and a higher clock frequency when drawing power from the internal battery.

12 Claims, 11 Drawing Sheets

DATA PROCESSING APPARATUS, DATA PROCESSING METHOD, AND PORTABLE COMMUNICATION TERMINAL APPARATUS

CROSS REFERENCES TO RELATED APPLICATIONS

The present invention contains subject matter related to Japanese Patent Application JP 2004-190795 filed in the Japanese Patent Office on Jun. 29, 2004, the entire contents of which are incorporated herein by reference.

BACKGROUND OF THE INVENTION

1. Field of the Invention

The present invention relates to data processing apparatuses, data processing methods, and portable communication terminal apparatuses. Particularly, the present invention relates to a data processing apparatus, a data processing method, and a portable communication terminal apparatus which are capable of performing high-speed data processing in, for example, an integrated circuit (IC) (large scale integration (LSI)) for contactless communication.

2. Description of the Related Art

Non-contact type IC card systems, which are well known as contactless communication systems, are often used in, for example, automatic ticket gates in stations.

FIG. 1 is a diagram schematically showing the structure of an IC card system in related art.

The IC card system in the related art includes a reader-writer (R/W) 1 and an IC card 2.

The R/W 1 transmits a radio signal to generate a radio-frequency (RF) field (electromagnetic field).

The IC card 2 has an antenna 11 composed of a loop coil and an LSI 12 for contactless communication.

When the IC card 2 comes close to the R/W 1 and enters the RF field that has a strength greater than a predetermined strength and that is generated by the R/W 1, the IC card 2 receives power produced by electromagnetic induction caused by the radio signal transmitted from the R/W 1 to start to operate. The IC card 2 performs data processing, for example, transmits and receives data to and from the R/W 1 by radio signals.

In other words, since the IC card 2 does not include a power supply, the IC card 2 receives the power produced by the electromagnetic induction in the antenna 11 (loop coil), caused by the radio signal transmitted from the R/W 1, to operate the LSI 12 and performs a variety of data processing.

The LSI 12 in the IC card 2 receives the power produced by the electromagnetic induction caused by the radio signal transmitted from the R/W 1 to operate in the manner described above. The power caused by the radio signal transmitted from the R/W 1 is reduced in the IC card 2 as the distance between the R/W 1 and the IC card 2 becomes longer.

For example, if the IC card 2 receives power $E_1$ that is not less than power $E_0$ and that is caused by the radio signal transmitted from the R/W 1 where $E_0$ denotes the minimum power for the LSI 12 in the IC card 2 to operate, when the IC card 2 is located at a position P1 relatively near to the R/W 1, the LSI 12 can operate at the position P1 to perform a variety of data processing.

In contrast, if the IC card 2 only receives power $E_2$ that is less than the power $E_0$ and that is caused by the radio signal transmitted from the R/W 1 when the IC card 2 is located at a position P2 farther away from the R/W 1 than the position P1, the LSI 12 cannot operate at the position P2.

Accordingly, the LSI 12 in the IC card 2 can operate only within a range near to the R/W 1.

Increasing the level of the radio signal output from the R/W 1 can expand the range in which the IC card 2 can operate. However, the output from the R/W 1 is restricted by the radio law or interference with a radio signal output from another R/W can cause a problem.

Hence, it is necessary to limit the level of the radio signal in the R/W 1, and the IC card 2 is designed in consideration of low power consumption such that the IC card 2 can operate with the power caused by the radio signal having the limited level.

The LSI 12 operates in synchronization with a clock. Setting the frequency of the clock to a lower value (setting the period of the clock to a longer value) is effective in saving the power consumption in the LSI 12, and the IC card 2 is designed such that the LSI 12 operates in synchronization with the clock having a sufficiently low frequency.

Since it takes some time to perform the data processing in the LSI 12, it is necessary for a user to stay at a position, where the LSI 12 can receive the power sufficient for the LSI 12 to operate from the R/W 1, for at least a time required for the data processing in the LSI 12 and to hold the IC card 2 over the R/W 1.

Incorporating the function of the IC card 2 into a portable apparatus, such as a portable telephone, has been proposed in recent years. Since the portable telephone has, for example, a battery pack serving as an internal power supply that causes the portable telephone to operate, the LSI 12 can operate even when the IC card 2 is away from the R/W 1 by allowing the IC card 2 incorporated in the portable telephone to receive the power from the internal power supply.

An apparatus and a method of seamlessly switching between the power supply that receives the power caused by the radio signal transmitted from the R/W 1 and the internal power supply in the portable telephone to supply the power to the LSI 12, when the function of the IC card is incorporated in the portable telephone, are proposed in, for example, Japanese Unexamined Patent Application Publication No. 2003-036427 (Patent Document 1).

SUMMARY OF THE INVENTION

In the method disclosed in Patent Document 1, supplying the power from the internal power supply in the portable telephone to the LSI 12 allows the LSI 12 to operate even when the IC card 2 is away from the R/W 1.

However, in the method disclosed in Patent Document 1, the LSI 12 operates in synchronization with the clock having a low frequency so as to be capable of operating with the power caused by the radio signal transmitted from the R/W 1, even when the internal power supply in the portable telephone can provide the power to the LSI 12. Accordingly, there is a problem in that it takes some time to perform the data processing in the LSI 12.

It is desirable to realize high-speed data processing.

According to an embodiment of the present invention, there is provided a data processing apparatus adapted to receive power to operate. The data processing apparatus includes clock generating means for generating a clock; data processing means for receiving the power from a first power supply in which the power is caused by a radio signal transmitted from another data processing apparatus or a second power supply, which is an internal power supply, to perform data processing in synchronization with the clock; and clock controlling means for controlling the clock in accordance with the power supply from which the data processing means receives the power.

The clock controlling means may control the frequency of the clock so as to be equal to a first frequency when the data processing means receives the power from the first power supply, and may control the frequency of the clock so as to be equal to a second frequency higher than the first frequency when the data processing means receives the power from the second power supply.

The data processing apparatus may include selecting means for selecting the first or the second power supply to supply the power to the data processing means.

The data processing apparatus may include power detecting means for determining the state of the second power supply and controlling supply of the power to the data processing means in accordance with the determination result. In this case, the selecting means may select the first or second power supply in accordance with the control of the supply of the power to the data processing means by the power detecting means.

When the data processing apparatus includes the power detecting means, the clock controlling means may control the clock in accordance with the control of the supply of the power to the data processing means by the power detecting means.

The data processing means may control the clock controlling means in accordance with the power supply from which the power is supplied to the data processing means, and the clock controlling means may control the clock in accordance with the control by the data processing means.

When the data processing apparatus includes the power detecting means, the data processing means may control the clock controlling means in accordance with the control of the supply of the power to the data processing means by the power detecting means, and the clock controlling means may control the clock in accordance with the control by the data processing means.

The data processing apparatus may include one IC chip or two IC chips corresponding to an analog unit and a logic unit, respectively.

According to another embodiment of the present invention, there is provided a portable communication terminal apparatus, such as personal digital assistant (PDA) or a portable telephone, having one IC chip or two or more IC chips. The data processing apparatus according to the embodiment of the present invention is embodied by the IC chip or two or more IC chips.

According to another embodiment of the present invention, there is provided a data processing method used in a data processing apparatus adapted to receive power to operate. The data processing apparatus includes clock generating means for generating a clock; data processing means for receiving the power from a first power supply in which the power is caused by a radio signal transmitted from another data processing apparatus or a second power supply, which is an internal power supply, to perform data processing in synchronization with the clock; and clock controlling means for controlling the clock in accordance with the power supply from which the data processing means receives the power. The data processing method includes the steps of controlling the clock in accordance with the power supply from which the data processing means receives the power, in the clock controlling means; and receiving the power from the first or second power supply to perform the data processing in synchronization with the clock, in the data processing means.

According to the present invention, the clock is generated in accordance with the power supply from which the data processing means receives the power and the data processing means receives the power from the first or second power supply to perform the data processing in synchronization with the clock.

According to the present invention, high-speed data processing can be realized.

DESCRIPTION OF THE PREFERRED EMBODIMENTS

Figure 1:
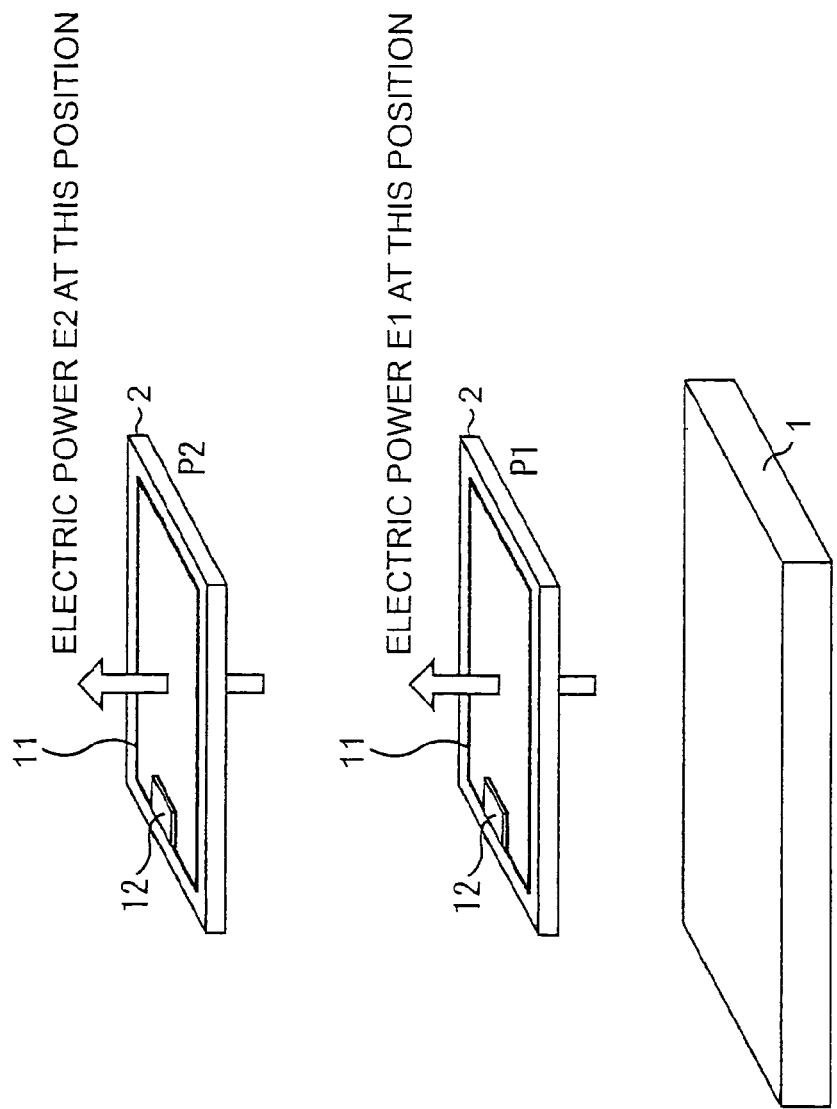
FIG. 1 is a diagram schematically showing the structure of an IC card system in related art.

The relationship between the elements in the claims and the examples in the embodiments is described next. The following description is intended to confirm whether the examples supporting the invention in the claims are described in the embodiments. Accordingly, even when some examples are described in the embodiments but not described in the following description as the elements, it does not mean that the examples do not correspond to the elements. Conversely, even when examples are described in the following description as the elements, it does not mean that the examples do not correspond to other elements.

In addition, the following description does not mean that the entire invention corresponding to the examples described in the embodiments is disclosed in the claims. In other words, the following description does not imply denial of the presence of the invention that corresponds to the examples described in the embodiments and that is not described in the claims, that is, of the presence of the invention that is to be filed as a divisional application or that is to be appended as an amendment.

A data processing apparatus (for example, an LSI 52 in FIG. 3) adapted to receive power to operate, according to an embodiment of the present invention, includes clock generating means (for example, a clock generator 61 in FIG. 3) for generating a clock; data processing means (for example, a CPU 63 in FIG. 3) for receiving the power from a first power supply (for example, a power supply circuit 68 in FIG. 6) in which the power is caused by a radio signal transmitted from another data processing apparatus (for example, a R/W 21 in FIG. 2) or a second power supply (for example, an internal power supply 71 in FIG. 6), which is an internal power supply, to perform data processing in synchronization with the clock; and clock controlling means (for example, a clock controller 62 in FIG. 3) for controlling the clock in accordance with the power supply from which the data processing means receives the power.

A data processing apparatus according to another embodiment of the present invention further includes selecting means (for example, a power switch 66 in FIG. 6) for selecting the first or the second power supply to supply the power to the data processing means.

A data processing apparatus according to another embodiment of the present invention further includes power detecting means (for example, a power detector circuit 65 in FIG. 6) for determining the state of the second power supply and controlling supply of the power to the data processing means in accordance with the determination result. The selecting means selects the first or second power supply in accordance with the control of the supply of the power to the data processing means by the power detecting means.

A data processing apparatus according to another embodiment of the present invention further includes power detecting means (for example, the power detector circuit 65 in FIG. 6) for determining the state of the second power supply and controlling supply of the power to the data processing means in accordance with the determination result. The clock controlling means controls the clock in accordance with the control of the supply of the power to the data processing means by the power detecting means.

A data processing apparatus according to another embodiment of the present invention further includes power detecting means (a power detector circuit 65 in FIG. 8) for determining the state of the second power supply and controlling supply of the power to the data processing means in accordance with the determination result. The data processing means controls the clock controlling means in accordance with the control of the supply of the power to the data processing means by the power detecting means, and the clock controlling means controls the clock in accordance with the control by the data processing means.

Figure 3:
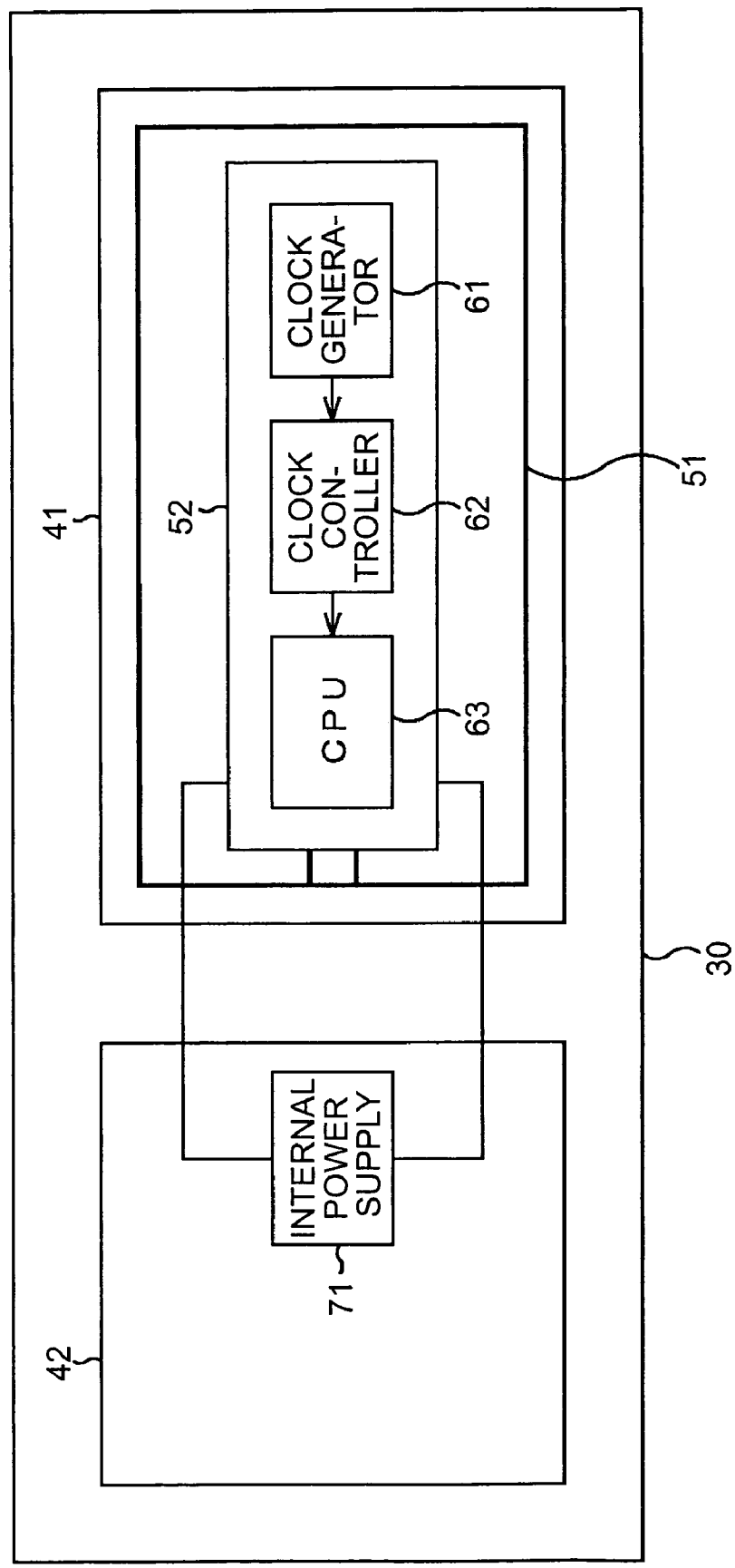
FIG. 3 is a block diagram schematically showing an example of the structure of a portable telephone.

A portable communication terminal apparatus according to an embodiment of the present invention includes a data processing unit (for example, the LSI 52 in FIG. 3) and an external circuit (for example, an external circuit 42 in FIG. 3). The data processing unit includes clock generating means (for example, the clock generator 61 in FIG. 3) for generating a clock; data processing means (for example, the CPU 63 in FIG. 3) for receiving the power from a first power supply in which the power is caused by a radio signal transmitted from another data processing apparatus or a second power supply, which is an internal power supply, to perform data processing in synchronization with the clock; and clock controlling means (for example, the clock controller 62 in FIG. 3) for controlling the clock in accordance with the power supply from which the data processing means receives the power. The external circuit includes at least the internal power supply.

In a portable communication terminal apparatus according to another embodiment of the present invention, the external circuit further includes power detecting means (for example, a power detector circuit 65 in FIG. 11) for determining the state of the second power supply and controlling supply of the power to the data processing means in accordance with the determination result.

A data processing method, according to an embodiment of the present invention, used in a data processing apparatus (for example, the LSI 52 in FIG. 3) that is adapted to receive power to operate and that includes clock generating means (the clock generator 61 in FIG. 3) for generating a clock; data processing means (for example, the CPU 63 in FIG. 3) for receiving the power from a first power supply (for example, the power supply circuit 68 in FIG. 6) in which the power is caused by a radio signal transmitted from another data processing apparatus (for example, the R/W 21 in FIG. 2) or a second power supply (for example, the internal power supply 71 in FIG. 6), which is an internal power supply, to perform data processing in synchronization with the clock; and clock controlling means (for example, the clock controller 62 in FIG. 3) for controlling the clock in accordance with the power supply from which the data processing means receives the power, includes the steps of controlling (for example, Step S3-2 or S5-2 in FIG. 7) the clock in accordance with the power supply from which the data processing means receives the power, in the clock controlling means, and of receiving (for example, Step S4 in FIG. 7) the power from the first or second power supply to perform the data processing in synchronization with the clock, in the data processing means.

Embodiments of the present invention will be described below with reference to the attached drawings.

Figure 2:
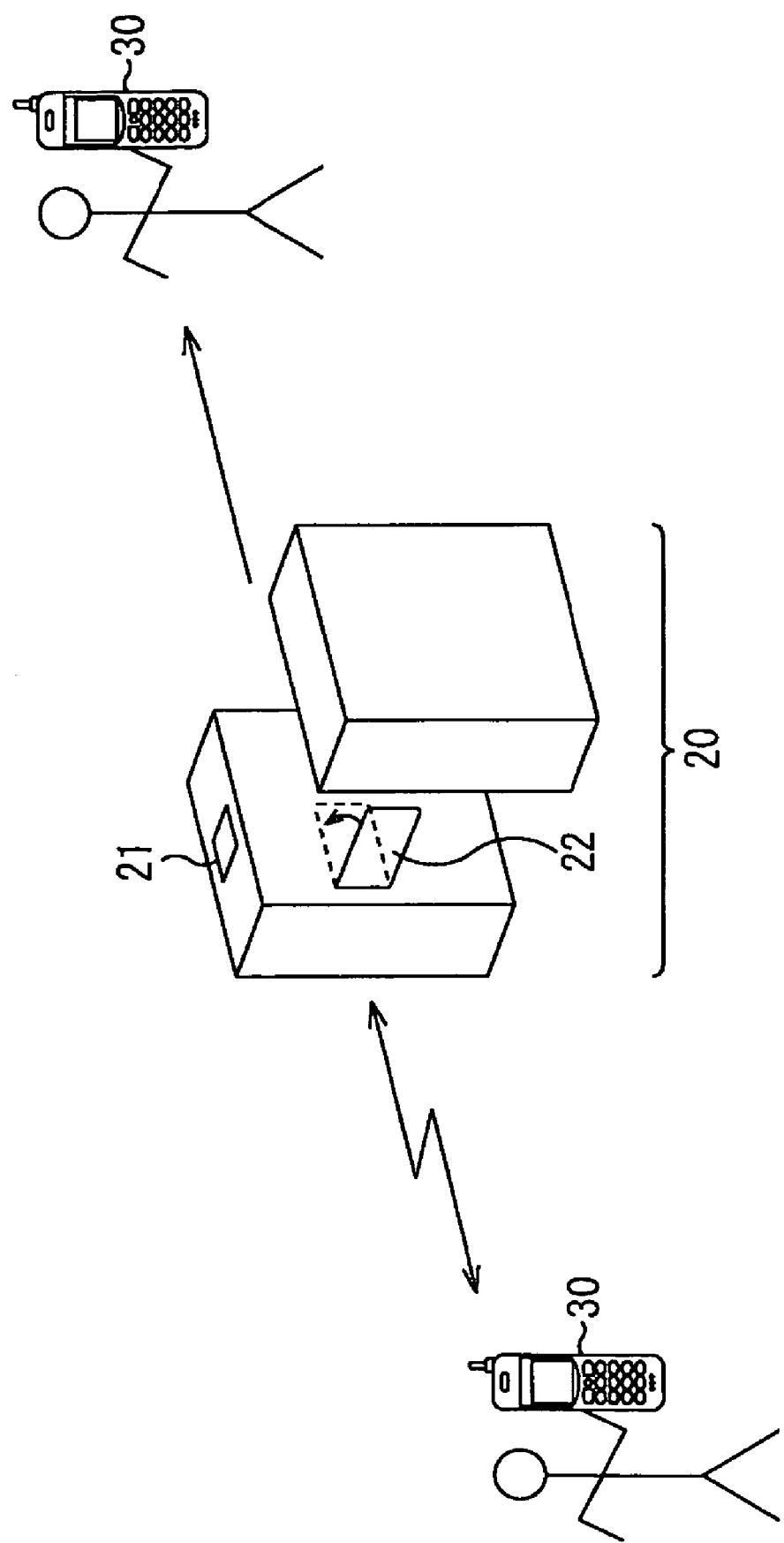
FIG. 2 is a perspective view of an automatic ticket gate system according to an embodiment of the present invention.

FIG. 2 is a perspective view of an automatic ticket gate system according to an embodiment of the present invention.

Referring to FIG. 2, the automatic ticket gate system has an automatic ticket checker 20 installed at, for example, a ticket gate in a station. The automatic ticket checker 20 includes a reader-writer (R/W) 21 and is provided with a door 22.

A user holds a portable telephone 30 over the R/W 21 while passing through the automatic ticket checker 20. When the user holds the portable telephone 30 over the R/W 21, the portable telephone 30 having a function of an IC card comes close to the R/W 21 that transmits and receives data to and from the portable telephone 30 by radio signals. Required data processing is performed between the R/W 21 and the portable telephone 30.

When the IC card in the portable telephone 30 has a function of, for example, a commuter pass, the R/W 21 reads out information concerning the commuter pass section and the expiration date from the IC card in the portable telephone 30 and confirms the section and the expiration date. If there is no problem with the section and the expiration date, the R/W 21 opens the door 22 such that the user carrying the portable telephone 30 is capable of passing through the automatic ticket checker 20. If there is a problem with the section and/or the expiration date, the R/W 21 closes the door 22 such that the user carrying the portable telephone 30 is not capable of passing through the automatic ticket checker 20.

When the IC card in the portable telephone 30 has a function of, for example, a prepaid card, the R/W 21 reads out information concerning the balance of the account for the prepaid card from the IC card in the portable telephone 30 and confirms whether there is any problem with the balance. If there is no problem with the balance, the R/W 21 controls the portable telephone 30 such that the portable telephone 30 writes the amount of the new balance by subtracting required fees from the current balance. The R/W 21 simultaneously opens the door 22 such that the user carrying the portable telephone 30 is capable of passing through the automatic ticket checker 20. If there is any problem with the balance, the R/W 21 closes the door 22 such that the user carrying the portable telephone 30 is not capable of passing through the automatic ticket checker 20.

When the R/W 21 transmits the data to the portable telephone 30, the R/W 21 modulates a carrier wave having a frequency of, for example, 13.56 MHz in accordance with the data and transmits the modulated wave as a radio signal. When the R/W 21 receives the data from the portable telephone 30, the R/W 21 transmits the carrier wave (unmodulated wave) having a frequency of, for example, 13.56 MHz as the radio signal. The portable telephone 30 performs load modulation for the radio signal, which is the carrier wave transmitted from the R/W 21, and transmits the modulated data to the R/W 21.

FIG. 3 is a block diagram schematically showing an example of the structure of the portable telephone 30 in FIG. 2.

Referring to FIG. 3, the portable telephone 30 includes a card functioning unit 41 and an external circuit 42.

The card functioning unit 41 has a function of an IC card and includes an antenna 51 composed of a loop coil and an LSI 52.

The antenna 51 receives the radio signal from the R/W 21 and supplies the received radio signal to the LSI 52.

The LSI 52 includes a clock generator 61, a clock controller 62, a central processing unit (CPU) 63, and so on.

The clock generator 61 generates a clock used for operating the CPU 63 and supplies the clock to the clock controller 62.

The clock controller 62 controls the clock supplied from the clock generator 61 in accordance with the power supply from which power is supplied to the CPU 63. For example, the clock controller 62 varies the frequency of the clock and supplies the clock to the CPU 63.

Methods of varying the frequency of the clock supplied from the clock generator 61, adopted in the clock controller 62, include a method of dividing the clock supplied from the clock generator 61 and a method of modulating the frequency (frequency modulation). When the clock supplied from the clock generator 61 is to be divided, the clock frequency is discretely varied to a value corresponding to the division ratio. When the clock supplied from the clock generator 61 is to be subjected to the frequency modulation, the clock frequency is continuously varied.

The CPU 63 processes the data, for example, which is transmitted from the R/W 21 as the radio signal and is received by the antenna 51, in synchronization with the clock supplied from the clock controller 62.

The external circuit 42 includes an internal power supply 71. The external circuit 42 receives power supplied from the internal power supply 71 and performs processing similar to that in a portable telephone in the related art. The processing includes calling, transmission and reception of electronic mail, browse of a Web page, and capture of a still image or a moving picture.

The internal power supply 71 is, for example, a battery pack and is removable from the portable telephone 30. The internal power supply 71 is charged with a battery charger (not shown) while being mounted in the portable telephone 30.

In the portable telephone 30 having the structure described above, the LSI 52 in the card functioning unit 41 receives the power generated by electromagnetic induction in the antenna 51 (the loop coil), the electromagnetic induction being caused by the radio signal supplied from the R/W 21 in FIG. 2, or the power from the internal power supply 71 to operate the portable telephone 30.

Specifically, the LSI 52 receives the power which is caused by the radio signal supplied from the R/W 21 or the power from the internal power supply 71 in the external circuit 42. In the LSI 52, the clock generator 61 generates a clock and supplies the generated clock to the clock controller 62. The clock controller 62 varies the frequency of the clock supplied from the clock generator 61, if necessary, and supplies the clock to the CPU 63. The CPU 63 performs the data processing in synchronization with the clock supplied from the clock controller 62.

As described above, the LSI 52 in the card functioning unit 41 receives the power caused by the radio signal supplied from the R/W 21 or the power from the internal power supply 71 in the external circuit 42 to perform the data processing.

Figure 4:
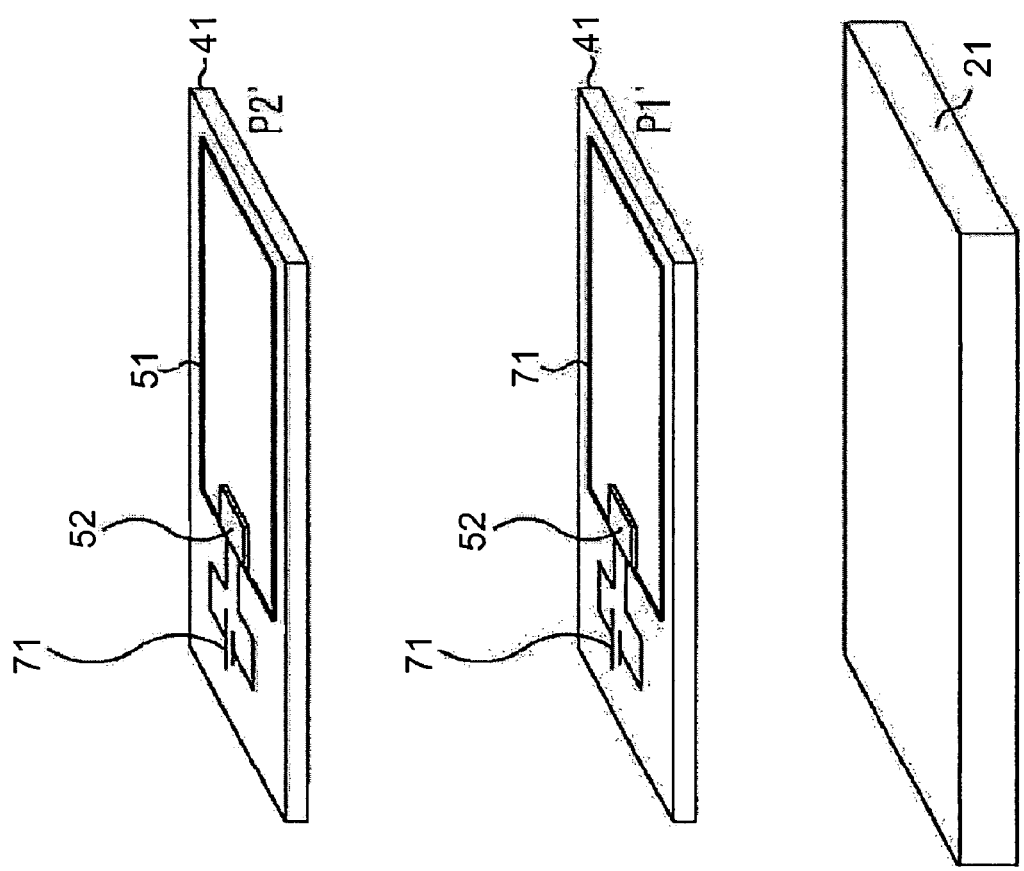
FIG. 4 is a diagram illustrating the operation of a card functioning unit.
Figure 5:
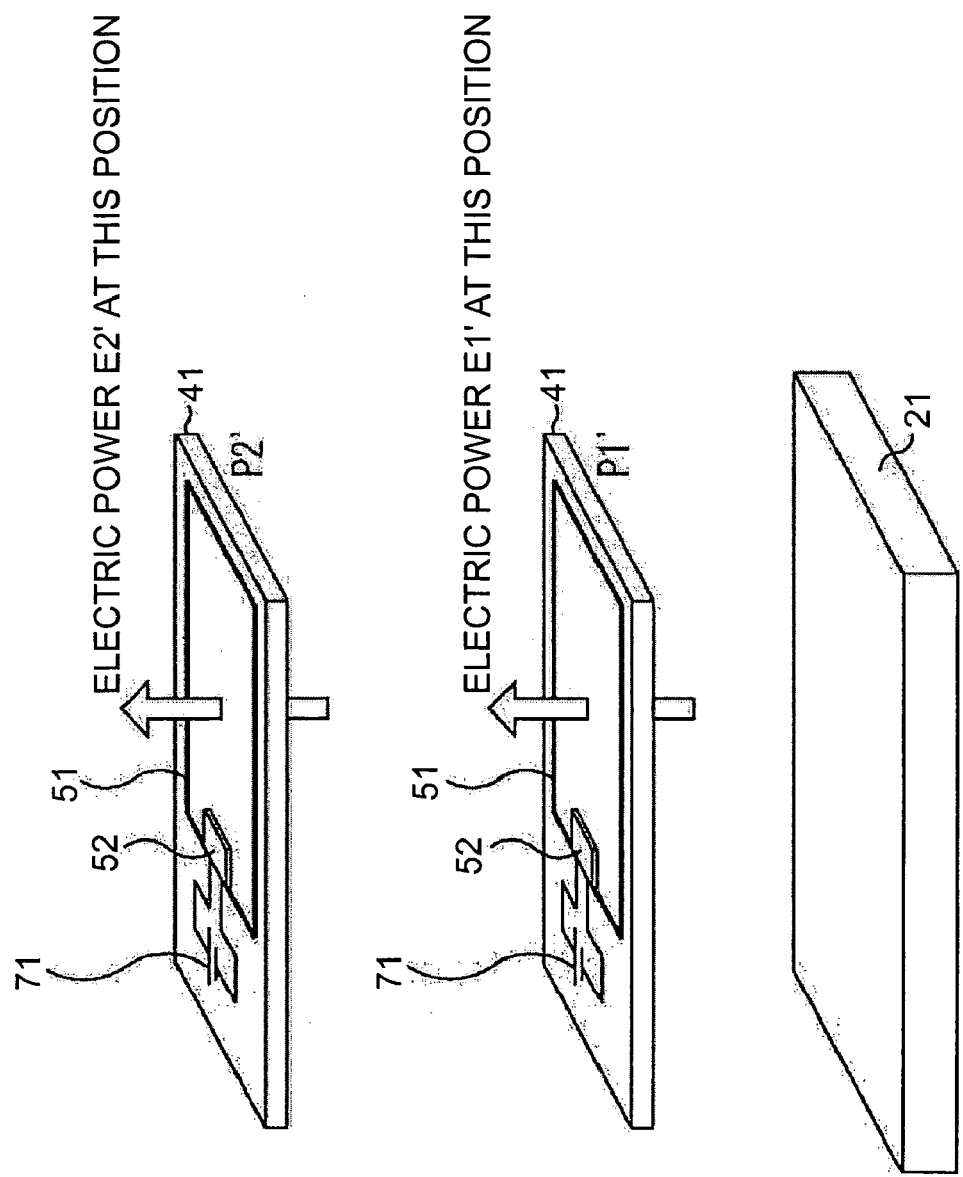
FIG. 5 is another diagram illustrating the operation of the card functioning unit.

FIG. 4 illustrates the data processing when the LSI 52 receives the power from the internal power supply 71. FIG. 5 illustrates the data processing when the LSI 52 receives the power caused by the radio signal supplied from the R/W 21.

The data processing when the LSI 52 in the card functioning unit 41 receives the power from the internal power supply 71 will now be described with reference to FIG. 4.

When the LSI 52 receives the power from the internal power supply 71, power sufficient to operate the LSI 52 is supplied from the internal power supply 71 to the LSI 52 except under special circumstances, for example, when a minute amount of electric power remains in the internal power supply 71 or when the internal power supply 71 is removed from the portable telephone 30. Accordingly, the request for power saving is modest, compared with the case in which the LSI 52 receives the power caused by the radio signal supplied from the R/W 21.

When the CPU 63 in the LSI 52 receives the power from the internal power supply 71, the clock controller 62 in FIG. 3 controls the frequency of the clock supplied from the clock generator 61 so as to be equal to a high frequency $f_1$ (for example, a frequency higher than the frequency of the clock generated in an IC card in related art) and supplies the clock to the CPU 63. Since the CPU 63 performs the data processing in synchronization with the clock having the high frequency $f_1$, high-speed data processing is realized in the CPU 63.

In addition, since the LSI 52 receives the power from the internal power supply 71, the LSI 52 can operate even when the card functioning unit 41 is located at a position P1' relatively near to the R/W 21 or even when the card functioning unit 41 is located at a position P2' farther away from the R/W 21 than the position P1', as shown in FIG. 4.

As described above, when the LSI 52 receives the power from the internal power supply 71, the LSI 52 can transmit and receive the data to and from the R/W 21 even when the card functioning unit 41 in the portable telephone 30 is far away from the R/W 21 and, furthermore, the high-speed data processing can be realized in the CPU 63 in the LSI 52.

It is assumed that the minimum power for the CPU 63 in the LSI 52 to perform the data processing in synchronization with the clock having the frequency $f_1$ is $E_{f1}$ and that power not lower than the power $E_{f1}$ is supplied from the internal power supply 71 to the CPU 63.

The frequency $f_1$ is set to, for example, a value given by adding a predetermined margin to the maximum frequency at which the CPU 63 can operate. The maximum frequency is specified in the specifications of the CPU 63.

The frequency of the clock output from the CPU 63 is set to, for example, the frequency $f_1$. In this case, when the LSI 52 receives the power from the internal power supply 71, the clock controller 62 supplies the clock having the frequency $f_1$, output from the clock generator 61, to the CPU 63 without change.

The data processing when the LSI 52 in the card functioning unit 41 receives the power caused by the radio signal supplied from the R/W 21 will now be described with reference to FIG. 5.

When the LSI 52 receives the power caused by the radio signal supplied from the R/W 21, the power caused by the radio signal supplied from the R/W 21 is reduced in the LSI 52 as the distance between the R/W 21 and the card functioning unit 41 becomes long, as described above with reference to FIG. 1. Even when the R/W 21 is close to the card functioning unit 41, the power caused by the radio signal supplied from the R/W 21 is lower than the power from the internal power supply 71.

When the CPU 63 in the LSI 52 receives the power caused by the radio signal supplied from the R/W 21, the clock controller 62 in FIG. 3 controls the frequency of the clock supplied from the clock generator 61 so as to be equal to a frequency $f_2$ that is lower than the frequency $f_1$ and supplies the clock to the CPU 63. Since the CPU 63 performs the data processing in synchronization with the clock having the low frequency $f_2$, the minimum power for the CPU 63 to operate can be reduced.

It is assumed that the minimum power for the CPU 63 in the LSI 52 to perform the data processing in synchronization with the clock having the frequency $f_2$ is $E_{f2}$ ($<E_{f1}$). When the card functioning unit 41 is located at a position P1' relatively near to the R/W 21, as shown in FIG. 5, the LSI 52 can operate at the position P1' to perform a variety of data processing as long as the power $E_1'$ caused by the radio signal supplied from the R/W 21 is not lower than the power $E_{f2}$ in the card functioning unit 41.

Similarly, when the card functioning unit 41 is located at a position P2' farther away from the R/W 21 than position P1', as shown in FIG. 5, the LSI 52 can operate at the position P2' to perform a variety of data processing as long as the power $E_2'$ ($<E_1'$) caused by the radio signal supplied from the R/W 21 is not lower than the power $E_{f2}$ in the card functioning unit 41. However, if the power caused by the radio signal supplied from the R/W 21 is lower than the power $E_{f2}$ in the card functioning unit 41, the LSI 52 cannot operate.

The frequency $f_2$ is set to, for example, a value given by adding a predetermined margin to the minimum frequency at which the CPU 63 can operate. The minimum frequency is specified in the specifications of the CPU 63.

The frequency of the clock output from the CPU 63 is set to, for example, the frequency $f_1$. In this case, when the LSI 52 receives the power caused by the radio signal supplied from the R/W 21, the clock controller 62 divides the clock having the frequency $f_1$, output from the clock generator 61, by the division ratio $f_2/f_1$ and supplies the divided clock to the CPU 63.

Figure 6:
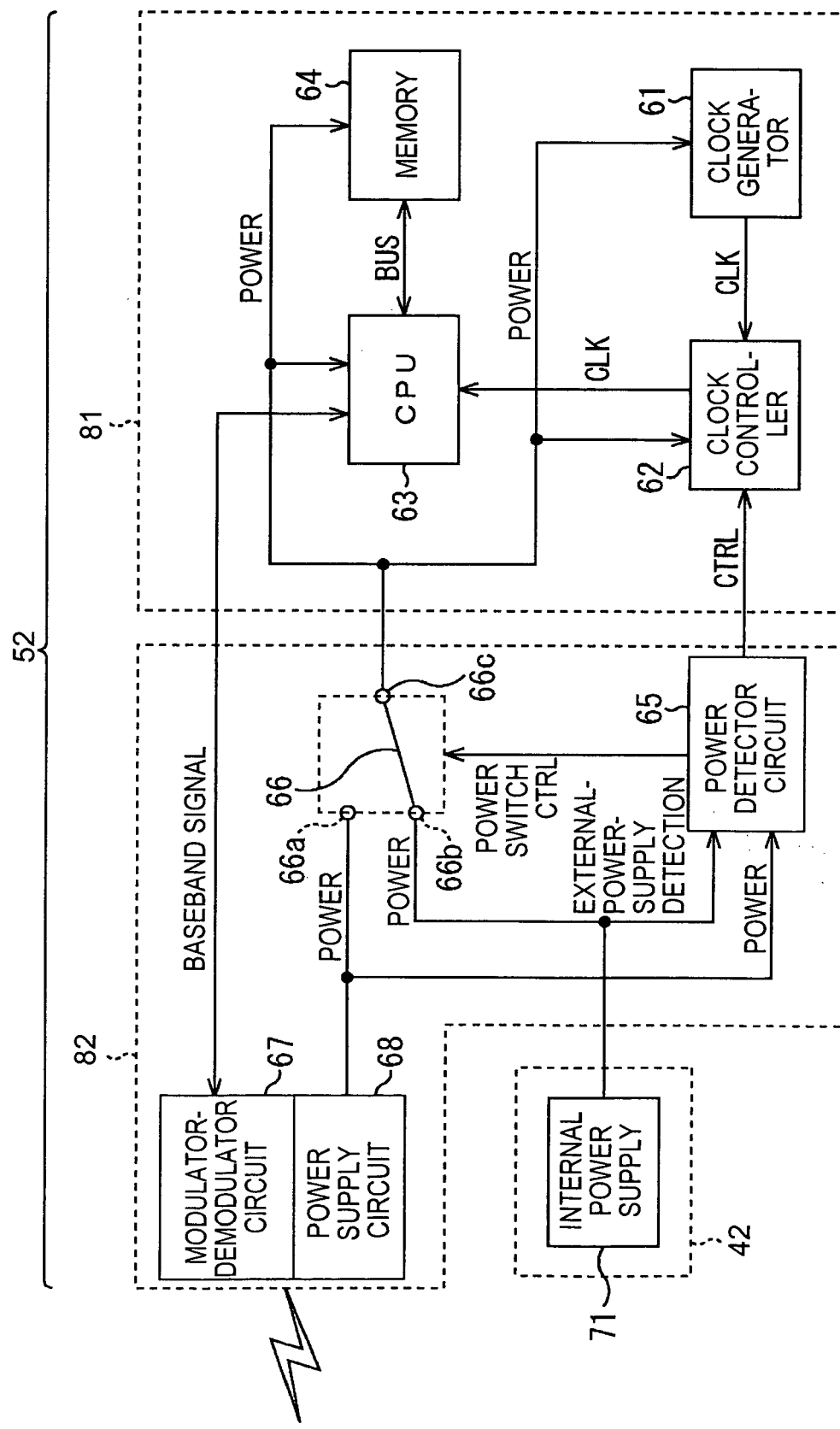
FIG. 6 is a block diagram showing in detail a first example of the structure of the portable telephone.

FIG. 6 is a block diagram showing in detail a first example of the structure of the portable telephone 30 in FIG. 2. The same reference numerals are used in FIG. 6 to identify the same components shown in FIG. 3. A detailed description of such components is omitted herein. The antenna 51 is not shown in FIG. 6 (the same applies to FIGS. 8, 10, and 11 described below).

The LSI 52 includes a logic circuit unit 81 and an analog circuit unit 82.

The logic circuit unit 81 mainly processes digital signals in the LSI 52. The logic circuit unit 81 includes a memory 64, in addition to the clock generator 61, the clock controller 62, and the CPU 63 shown in FIG. 3.

The clock generator 61 receives power supplied through a power switch 66 described below in the analog circuit unit 82 to operate. The clock generator 61 generates a clock CLK and supplies the generated clock to the clock controller 62.

The clock controller 62 receives the power supplied through the power switch 66 in the analog circuit unit 82 to operate. The clock controller 62 controls the clock CLK supplied from the clock generator 61 in accordance with a control signal CTRL supplied from a power detector circuit 65 described below in the analog circuit unit 82 and supplies the clock CLK to the CPU 63.

Specifically, the clock controller 62 controls the frequency of the clock CLK supplied from the clock generator 61, in accordance with the control signal CTRL supplied from the power detector circuit 65, so as to be equal to the high frequency $f_1$, such as the maximum frequency at which the CPU 63 can operate, or to the frequency $f_2$ ($<f_1$), which is lower than the frequency $f_1$, such as the minimum frequency at which the CPU 63 can operate, and supplies the clock CLK having the frequency $f_1$ or $f_2$ to the CPU 63.

The CPU 63 receives the power supplied through the power switch 66 to operate. The CPU 63 performs the data processing in synchronization with the clock CLK having the frequency $f_1$ or $f_2$, supplied from the clock controller 62.

Specifically, a baseband signal as data (including commands) transmitted from the R/W 21 in FIG. 2 is supplied from a modulator-demodulator circuit 67 described below in the analog circuit unit 82 to the CPU 63. The CPU 63 processes the data supplied from the modulator-demodulator circuit 67 or the data stored in the memory 64, if necessary, in synchronization with the clock CLK supplied from the clock controller 62. The CPU 63 supplies the processed data or the data supplied from the modulator-demodulator circuit 67 to the memory 64 that stores the supplied data. Furthermore, the CPU 63 reads out the data stored in the memory 64, processes the readout data, if necessary, and supplies the processed data to the modulator-demodulator circuit 67 as the baseband signal. The modulator-demodulator circuit 67 transmits the supplied data to the R/W 21.

The memory 64, which is, for example, a nonvolatile memory, receives the power supplied through the power switch 66 to operate and stores the data supplied from the CPU 63. The memory 64 stores programs executed by the CPU 63. In other words, the CPU 63 performs a variety of processing by executing the programs stored in the memory 64.

The programs executed by the CPU 63 may be stored in a removable recording medium, such as a flexible disk, a compact disc read only memory (CD-ROM), a magneto-optical (MO) disk, a digital versatile disc (DVD), or a semiconductor memory, to be offered as package software, in addition to being stored in the memory 64 in advance. The programs may be transmitted from the R/W 21 to the LSI 52 by radio signals to be stored in the memory 64. The programs stored in the memory 64 may be updated.

The analog circuit unit 82 mainly processes analog signals in the LSI 52. The analog circuit unit 82 includes the power detector circuit 65, the power switch 66, the modulator-demodulator circuit 67, and a power supply circuit 68.

The power detector circuit 65 receives the power supplied from the power supply circuit 68 to operate. The power detector circuit 65 monitors the state of the internal power supply 71 in the external circuit 42 in the portable telephone 30 in FIG. 3 to detect the state of the internal power supply 71 and controls supply of the power to each block in the logic circuit unit 81, such as the CPU 63, in response to the detection result.

Specifically, the power detector circuit 65 determines whether the internal power supply 71 can provide sufficient power. The determination is based on detection of the voltage of the internal power supply 71 or the mounted state of the internal power supply 71. For example, when the internal power supply 71 is removed from the portable telephone 30, the power detector circuit 65 detects that the internal power supply 71 cannot provide the sufficient power. When the voltage of the internal power supply 71 is lower than a predetermined threshold even with the internal power supply 71 being mounted in the portable telephone 30, the power detector circuit 65 also detects that the internal power supply 71 cannot provide the sufficient power. In contrast, when the internal power supply 71 is mounted in the portable telephone 30 and the voltage of the internal power supply 71 is higher than the predetermined threshold, the power detector circuit 65 detects that the internal power supply 71 can provide the sufficient power.

If the power detector circuit 65 detects that the internal power supply 71 can provide the sufficient power, the power detector circuit 65 supplies a control signal CTRL indicating that the frequency of the clock is to be set to the high frequency $f_1$ to the clock controller 62. The power detector circuit 65 also supplies a power switch control signal CTRL indicating that the internal power supply 71 is to be selected from among the power supply circuit 68 and the internal power supply 71 to the power switch 66.

If the power detector circuit 65 detects that the internal power supply 71 cannot provide the sufficient power, the power detector circuit 65 supplies a control signal CTRL indicating that the frequency of the clock is to be set to the low frequency $f_2$ ($<f_1$) to the clock controller 62. The power detector circuit 65 also supplies a power switch control signal CTRL indicating that the power supply circuit 68 is to be selected from among the power supply circuit 68 and the internal power supply 71 to the power switch 66.

Although the power detector circuit 65 receives the power from the power supply circuit 68 to operate, the power detector circuit 65 may receive the power from the internal power supply 71, instead of the power from the power supply circuit 68, to operate.

The power switch 66 has input terminals 66a and 66b and an output terminal 66c. The input terminal 66a is connected to the power supply circuit 68, the input terminal 66b is connected to the internal power supply 71, and the output terminal 66c is connected to the clock generator 61, the clock controller 62, the CPU 63, and the memory 64 in the logic circuit unit 81.

The power switch 66 selects the input terminal 66a or 66b in accordance with the power switch control signal CTRL supplied from the power detector circuit 65 and connects the selected input terminal 66a or 66b to the output terminal 66c.

Accordingly, when the power switch 66 selects the input terminal 66a from among the input terminals 66a and 66b, the power supplied from the power supply circuit 68 connected to the input terminal 66a is supplied to the clock generator 61, the clock controller 62, the CPU 63, and the memory 64 in the logic circuit unit 81 through the input terminal 66a and the output terminal 66c. In this case, the clock generator 61, the clock controller 62, the CPU 63, and the memory 64 receive the power from the power supply circuit 68 to operate.

When the power switch 66 selects the input terminal 66b from among the input terminals 66a and 66b, the power supplied from the internal power supply 71 connected to the input terminal 66b is supplied to the clock generator 61, the clock controller 62, the CPU 63, and the memory 64 in the logic circuit unit 81 through the input terminal 66b and the output terminal 66c. In this case, the clock generator 61, the clock controller 62, the CPU 63, and the memory 64 receive the power from the internal power supply 71 to operate.

The power supply circuit 68 includes, for example, a rectifier or a power regulator. The power supply circuit 68 receives the power caused by the radio signal supplied from the R/W 21 (the radio signal transmitted from the R/W 21 and received by the antenna 51 in FIG. 3) and supplies the received power to the power detector circuit 65 and to the input terminal 66a of the power switch 66.

The modulator-demodulator circuit 67 modulates the radio signal supplied from the R/W 21 into the baseband signal and supplies the baseband data to the CPU 63. The modulator-demodulator circuit 67 performs the load modulation for the radio signal (carrier) transmitted from the R/W 21, in accordance with the baseband data supplied from the CPU 63 (varies the impedance of the antenna 51 in FIG. 3 with respect to the R/W 21) and transmits the modulated data to the R/W 21.

Figure 7:
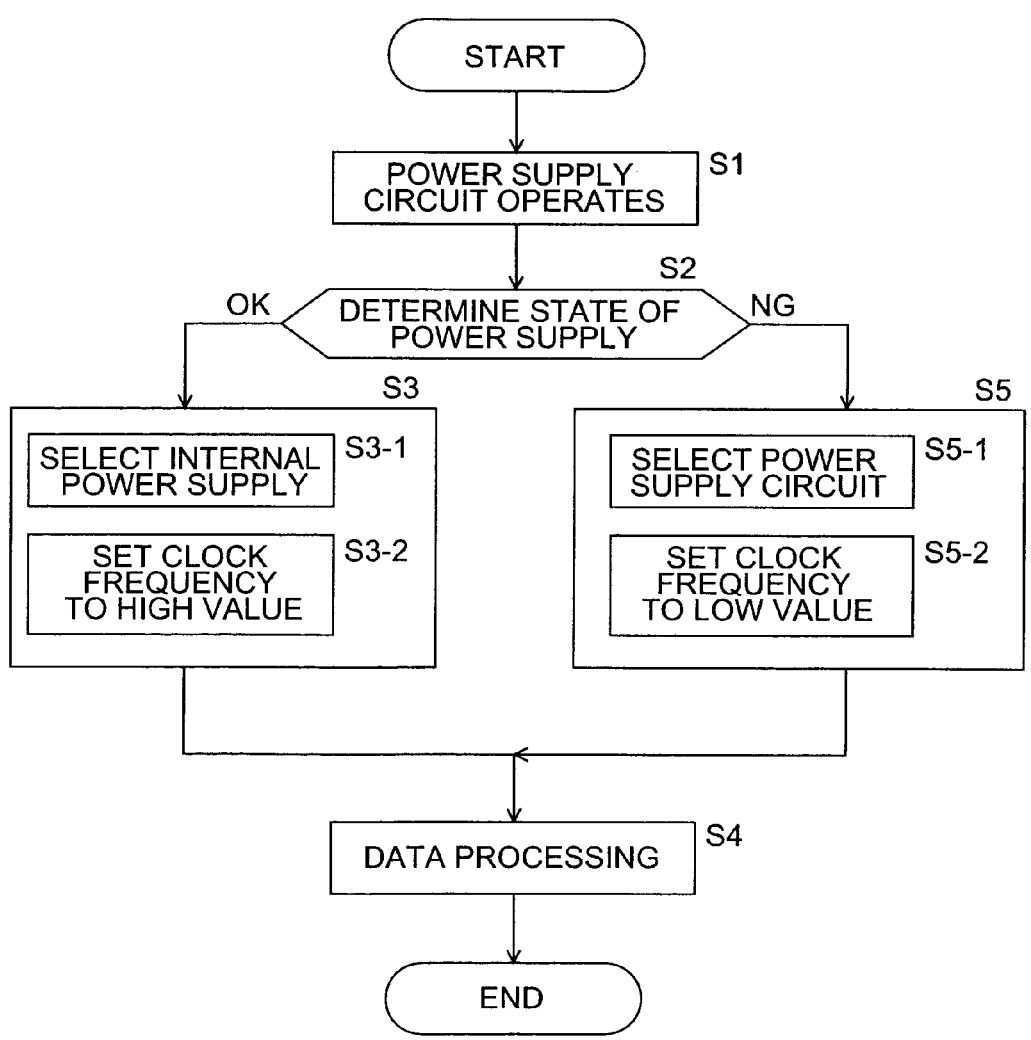
FIG. 7 is a flowchart illustrating the operation of the portable telephone in FIG. 6.

FIG. 7 is a flowchart showing the operation of the portable telephone 30 in FIG. 6.

For example, when the portable telephone 30 is held over the R/W 21 in FIG. 2, in Step S1, the power supply circuit 68 operates to output power.

Specifically, induced electromotive force is produced by electromagnetic induction in the antenna 51 (the loop coil) in the card functioning unit 41 contained in the portable telephone 30 in response to the radio signal transmitted from the R/W 21 to apply an induced current to the power supply circuit 68. The power supply circuit 68 rectifies the current to obtain the power and outputs the power.

The power output from the power supply circuit 68 is supplied to the input terminal 66a of the power switch 66 and to the power detector circuit 65.

The power detector circuit 65 receives the power from the power supply circuit 68 to operate, that is, to start to monitor the state of the internal power supply 71. In Step S2, the power detector circuit 65, which operates with the power supplied from the power supply circuit 68, determines the state of the internal power supply 71.

If the power detector circuit 65 determines in Step S2 that the internal power supply 71 can provide sufficient power, for example, when the internal power supply 71 is mounted in the portable telephone 30 and the voltage of the internal power supply 71 is higher than a predetermined value, the power detector circuit 65 proceeds to Step S3. In Step 3, the power detector circuit 65 selects the power supply from which the portable telephone 30 receives the power in Step S3-1 and sets the frequency of the clock to a high value in Step S3-2.

Specifically, in Step S3-1, the power detector circuit 65 supplies the power switch control signal CTRL indicating that the input terminal 66b is to be selected from among the input terminals 66a and 66b to the power switch 66. The power switch 66 selects the input terminal 66b from among the input terminals 66a and 66b in accordance with the power switch control signal CTRL supplied from the power detector circuit 65. In this manner, the power is supplied from the internal power supply 71 to the clock generator 61, the clock controller 62, the CPU 63, and the memory 64 in the logic circuit unit 81 through the power switch 66. The clock generator 61, the clock controller 62, the CPU 63, and the memory 64 receive the power from the internal power supply 71 to start to operate.

In Step S3-2, the power detector circuit 65 supplies the control signal CTRL indicating that the frequency of the clock is to be set to the high frequency $f_1$ to the clock controller 62. The clock controller 62 controls the frequency of the clock CLK output from the clock generator 61 so as to be equal to the high frequency $f_1$, in accordance with the control signal CTRL supplied from the power detector circuit 65, and the supplies the clock CLK having the frequency $f_1$ to the CPU 63.

In Step S4, the CPU 63 performs the data processing in synchronization with the clock CLK supplied from the clock controller 62.

In other words, the R/W 21 transmits the data including necessary commands by the radio signal and the modulator-demodulator circuit 67 receives the radio signal through the antenna 51. The modulator-demodulator circuit 67 demodulates the radio signal into the baseband data that is supplied to the CPU 63.

The CPU 63 processes the data supplied from the modulator-demodulator circuit 67 or the data stored in the memory 64, if necessary, in accordance with the commands in the data supplied from the modulator-demodulator circuit 67. The CPU 63 supplies the processed data or the data supplied from the modulator-demodulator circuit 67 to the memory 64 that stores the supplied data. Alternatively, the CPU 63 reads out the data stored in the memory 64, processes the readout data, if necessary, and supplies the processed data to the modulator-demodulator circuit 67 as the baseband signal. The modulator-demodulator circuit 67 transmits the supplied data to the R/W 21.

In this case, the sufficient power is supplied from the internal power supply 71 to the CPU 63 that operates in synchronization with the clock CLK having the high frequency $f_1$, supplied from the clock controller 62, so that high-speed data processing can be realized.

If the power detector circuit 65 determines in Step S2 that the internal power supply 71 cannot provide the sufficient power, for example, when the internal power supply 71 is removed from the portable telephone 30 or when the internal power supply 71 is mounted in the portable telephone 30 but the voltage of the internal power supply 71 is lower than the predetermined value, the power detector circuit 65 proceeds to Step S5. In Step S5, the power detector circuit 65 selects the power supply from which the portable telephone 30 receives the power in Step S5-1 and sets the frequency of the clock to a low value in Step S5-2.

Specifically, in Step S5-1, the power detector circuit 65 supplies the power switch control signal CTRL indicating that the input terminal 66a is to be selected from among the input terminals 66a and 66b to the power switch 66. The power switch 66 selects the input terminal 66a from among the input terminals 66a and 66b in accordance with the power switch control signal CTRL supplied from the power detector circuit 65. In this manner, the power produced by the electromagnetic induction caused by the radio signal supplied from the R/W 21 is supplied from the power supply circuit 68 to the clock generator 61, the clock controller 62, the CPU 63, and the memory 64 in the logic circuit unit 81 through the power switch 66. The clock generator 61, the clock controller 62, the CPU 63, and the memory 64 receive the power from the power supply circuit 68 to start to operate.

In Step S5-2, the power detector circuit 65 supplies the control signal CTRL indicating that the frequency of the clock is to be set to the low frequency $f_2$ to the clock controller 62. The clock controller 62 controls the frequency of the clock CLK output from the clock generator 61 so as to be equal to the low frequency $f_2$, in accordance with the control signal CTRL supplied from the power detector circuit 65, and the supplies the clock CLK having the frequency $f_2$ to the CPU 63.

In Step S4, the CPU 63 performs the data processing in synchronization with the clock CLK supplied from the clock controller 62.

In this case, the CPU 63 receives the power from the power supply circuit 68 to operate in synchronization with the clock CLK having the low frequency $f_2$; supplied from the clock controller 62, so that the data processing can be performed with reduced power consumption, although at low speed.

As described above, the CPU 63 receives the power from the power supply circuit 68 or the internal power supply 71 to operate and performs the data processing in synchronization with the clock CLK supplied from the clock controller 62. If the CPU 63 receives sufficient power from the internal power supply 71, the clock controller 62 sets the frequency of the clock CLK to be supplied to the CPU 63 to the high frequency $f_1$. Accordingly, the CPU 63 can operate regardless of the distance between the R/W 21 and the card functioning unit 41 in the portable telephone 30 in this case, as described above with reference to FIG. 4, so that higher-speed data processing can be realized.

If the CPU 63 receives the power from the power supply circuit 68, which is affected by the distance between the R/W 21 and the card functioning unit 41 in the 330, the clock controller 62 sets the frequency of the clock CLK to be supplied to the CPU 63 to the low frequency $f_2$. Accordingly, the CPU 63 can perform the data processing with reduced power consumption, although at low speed, in this case.

The power detector circuit 65 determines the state of the internal power supply 71. The CPU 63 receives the power from the internal power supply 71 if the power detector circuit 65 determines that the internal power supply 71 can provide the sufficient power, and receives the power from the power supply circuit 68 if the power detector circuit 65 determines that the internal power supply 71 cannot provide the sufficient power. Hence, even when the internal power supply 71 is removed from the portable telephone 30 or when a minute amount of electric power (or no electric power) remains in the internal power supply 71, at least the card functioning unit 41 can operate. In other words, even when the internal power supply 71 cannot provide the sufficient power and the external circuit 42 in the portable telephone 30 cannot operate, the card functioning unit 41 can operate.

When the CPU 63 receives the power from the power supply circuit 68 to operate, setting the frequency of the clock CLK to be supplied to the CPU 63 to a frequency $f_3$ lower than the frequency $f_2$ by the clock controller 62 allows the CPU 63 to operate with lower power consumption, although the data processing in the CPU 63 is reduced in speed. Accordingly, the CPU 63 can operate even when the distance between the R/W 21 and the portable telephone 30 becomes longer. However, it is assumed that the inequality expression $f_1 > f_2 > f_3$ is established in the frequency range in which the CPU 63 can operate.

Figure 8:
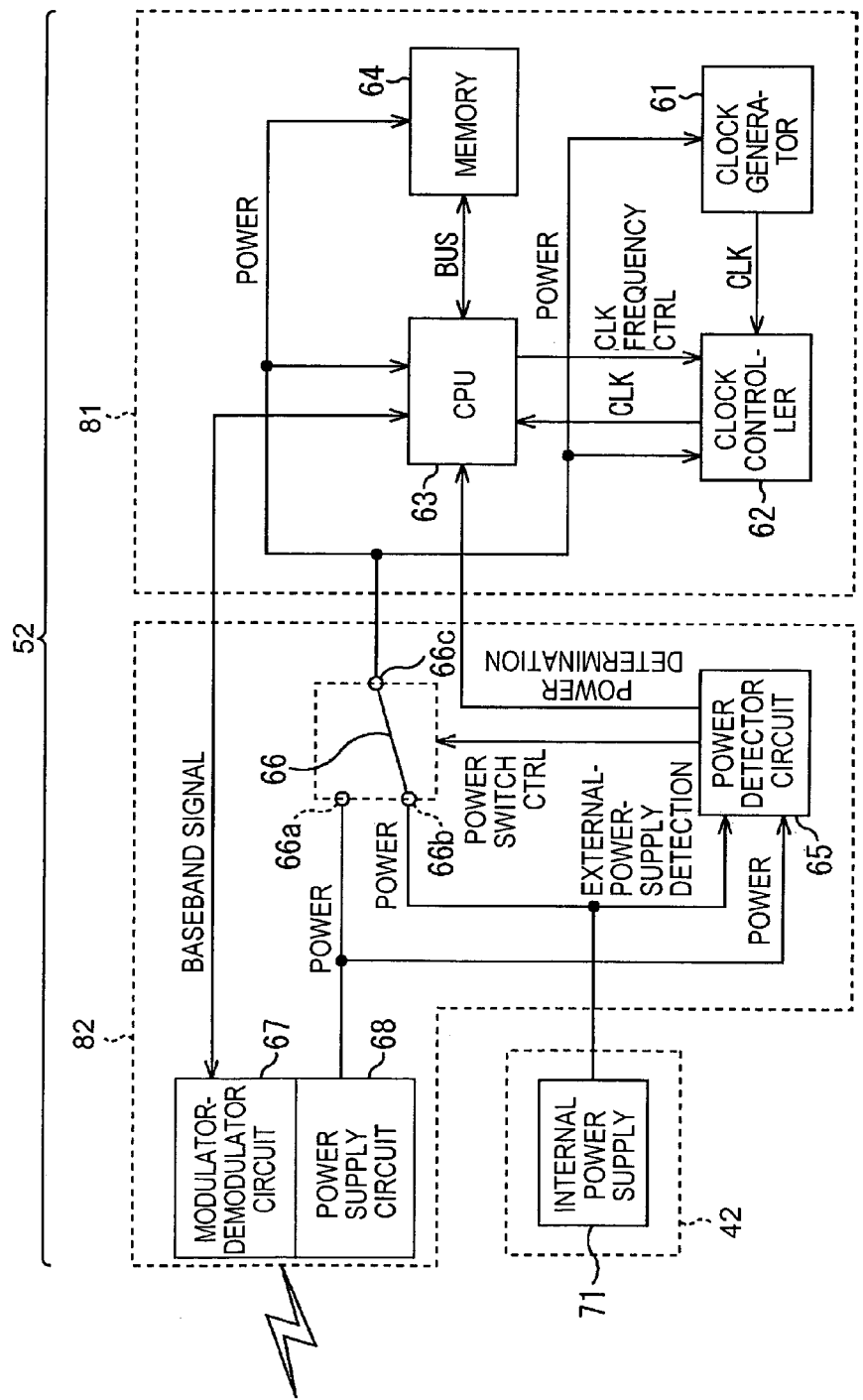
FIG. 8 is a block diagram showing in detail a second example of the structure of the portable telephone.

FIG. 8 is a block diagram showing in detail a second example of the structure of the portable telephone 30 in FIG. 2. The same reference numerals are used in FIG. 8 to identify the same components shown in FIG. 6. A detailed description of such components is omitted herein.

The portable telephone 30 in FIG. 8 basically has the same structure as in FIG. 6. However, the control signal CTRL controlling the frequency of the clock CLK is supplied from the power detector circuit 65 to the clock controller 62 in FIG. 6, whereas the determination signal indicating whether the internal power supply 71 can provide the sufficient power is supplied from the power detector circuit 65 to the CPU 63 and a control signal CTRL controlling the frequency of the clock CLK is supplied from the CPU 63 to the clock controller 62 in FIG. 8.

In other words, in the portable telephone 30 in FIG. 8, the clock controller 62 controls the clock CLK supplied from the clock generator 61 in accordance with the control signal CTRL output from the CPU 63, instead of the power detector circuit 65, and supplies the clock CLK to the CPU 63.

The CPU 63 not only performs the data processing in synchronization with the clock CLK supplied from the clock controller 62 but also supplies the control signal CTRL controlling the frequency of the clock CLK to the clock controller 62 in accordance with the determination signal indicating whether the internal power supply 71 can provide the sufficient power, the determination signal being supplied from the power detector circuit 65.

Specifically, if the determination signal supplied from the power detector circuit 65 indicates that the internal power supply 71 can provide the sufficient power, the CPU 63 supplies the control signal CTRL indicating that the frequency of the clock is to be set to the high frequency $f_1$ to the clock controller 62. If the determination signal supplied from the power detector circuit 65 indicates that the internal power supply 71 cannot provide the sufficient power, the CPU 63 supplies the control signal CTRL indicating that the frequency of the clock is to be set to the low frequency $f_2$ to the clock controller 62.

The power detector circuit 65 determines whether the internal power supply 71 can provide the sufficient power and, then, supplies the determination signal indicating the determination result to the CPU 63, instead of supplying the control signal CTRL to the clock controller 62.

Figure 9:
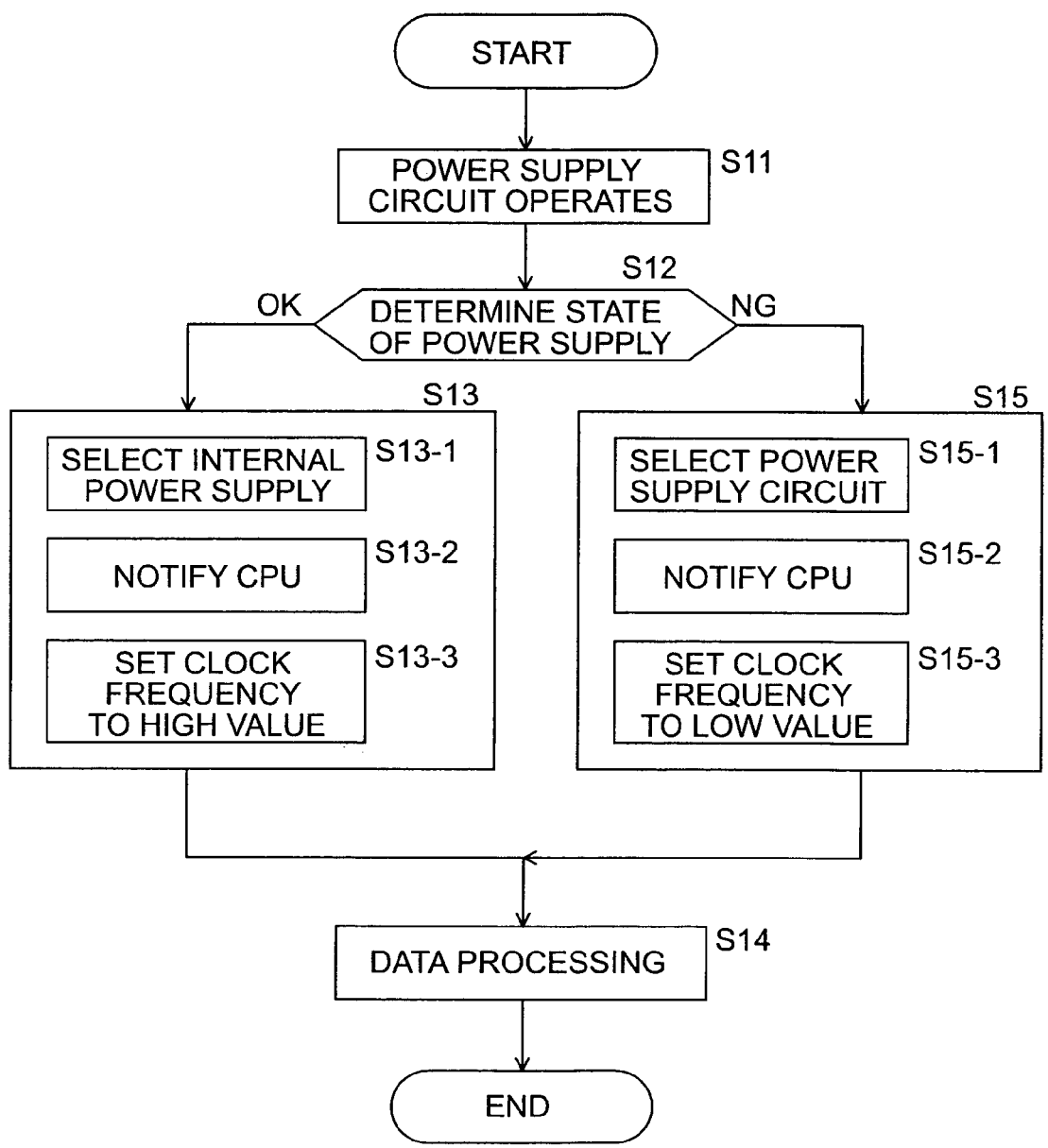
FIG. 9 is a flowchart illustrating the operation of the portable telephone in FIG. 8.

FIG. 9 is a flowchart showing the operation of the portable telephone 30 in FIG. 8.

For example, when the portable telephone 30 is held over the R/W 21 in FIG. 2, in Step S11, the power supply circuit 68 operates to output the power, produced by the electromagnetic induction caused by the radio signal supplied from the R/W 21, as in Step S1 in FIG. 7. The power output from the power supply circuit 68 is supplied to the input terminal 66a of the power switch 66 and to the power detector circuit 65.

The power detector circuit 65 receives the power from the power supply circuit 68 to operate, that is, to start to monitor the state of the internal power supply 71. In Step S12, the power detector circuit 65, which operates with the power supplied from the power supply circuit 68, determines the state of the internal power supply 71.

If the power detector circuit 65 determines in Step S12 that the internal power supply 71 can provide sufficient power, for example, when the internal power supply 71 is mounted in the portable telephone 30 and the voltage of the internal power supply 71 is higher than a predetermined value, the power detector circuit 65 proceeds to Step S13. In Step 13, the power detector circuit 65 selects the power supply from which the portable telephone 30 receives the power in Step S13-1, notifies the CPU 63 that the internal power supply 71 can provide the sufficient power in Step S13-2, and sets the frequency of the clock to a high value in Step S13-3.

Specifically, in Step S13-1, the power detector circuit 65 supplies the power switch control signal CTRL indicating that the input terminal 66b is to be selected from among the input terminals 66a and 66b to the power switch 66. The power switch 66 selects the input terminal 66b from among the input terminals 66a and 66b in accordance with the power switch control signal CTRL supplied from the power detector circuit 65. In this manner, the power is supplied from the internal power supply 71 to the clock generator 61, the clock controller 62, the CPU 63, and the memory 64 in the logic circuit unit 81 through the power switch 66. The clock generator 61, the clock controller 62, the CPU 63, and the memory 64 receive the power from the internal power supply 71 to start to operate.

After the clock controller 62 starts to operates, the clock controller 62 controls the frequency of the clock CLK, output from the clock generator 61, so as to be equal to a default frequency, such as the low frequency $f_2$, at which the CPU 63 can operate when it receives the power from the power supply circuit 68, to start to output the clock CLK. The CPU 63 to which the clock CLK having the default frequency is supplied from the clock controller 62 can operate in synchronization with the clock CLK having the default frequency.

In Step S13-2, the power detector circuit 65 supplies the determination signal indicating that the internal power supply 71 can provide the sufficient power to the CPU 63 to notify the CPU 63 that the internal power supply 71 can provide the sufficient power. In other words, the CPU 63, which operates in synchronization with the clock CLK having the default frequency, receives the determination signal from the power detector circuit 65 to recognize that the sufficient power is supplied from the internal power supply 71 and proceeds to Step S13-3.

In Step S13-3, the CPU 63, which has recognized that the sufficient power is supplied from the internal power supply 71, supplies the control signal CTRL indicating that the frequency of the clock is to be set to the high frequency $f_1$ to the clock controller 62. The clock controller 62 controls the frequency of the clock CLK output from the clock generator 61 so as to be equal to the high frequency $f_1$, in accordance with the control signal CTRL supplied from the CPU 63, and the supplies the clock CLK having the frequency $f_1$ to the CPU 63.

In Step S14, the CPU 63 performs the data processing in synchronization with the clock CLK supplied from the clock controller 62, as described in Step S4 in FIG. 7.

In this case, the sufficient power is supplied from the internal power supply 71 to the CPU 63 that operates in synchronization with the clock CLK having the high frequency $f_1$, supplied from the clock controller 62, so that high-speed data processing can be realized.

If the power detector circuit 65 determines in Step S12 that the internal power supply 71 cannot provide the sufficient power, for example, when the internal power supply 71 is removed from the portable telephone 30 or when the internal power supply 71 is mounted in the portable telephone 30 but the voltage of the internal power supply 71 is lower than the predetermined value, the power detector circuit 65 proceeds to Step S15. The power detector circuit 65 selects the power supply from which the portable telephone 30 receives the power in Step S15-1, notifies the CPU 63 that the internal power supply 71 cannot provide the sufficient power in Step S15-2, and sets the frequency of the clock to a low value in Step S15-3.

Specifically, in Step S15-1, the power detector circuit 65 supplies the power switch control signal CTRL indicating that the input terminal 66a is to be selected from among the input terminals 66a and 66b to the power switch 66. The power switch 66 selects the input terminal 66a from among the input terminals 66a and 66b in accordance with the power switch control signal CTRL supplied from the power detector circuit 65. In this manner, the power produced by the electromagnetic induction caused by the radio signal supplied from the R/W 21 is supplied from the power supply circuit 68 to the clock generator 61, the clock controller 62, the CPU 63, and the memory 64 in the logic circuit unit 81 through the power switch 66. The clock generator 61, the clock controller 62, the CPU 63, and the memory 64 receive the power from the power supply circuit 68 to start to operate.

As in Step S13-1, after the clock controller 62 starts to operates, the clock controller 62 controls the frequency of the clock CLK, output from the clock generator 61, so as to be equal to a default frequency, such as the low frequency $f_2$, at which the CPU 63 can operate when it receives the power from the power supply circuit 68, to start to output the clock CLK. The CPU 63 to which the clock CLK having the default frequency is supplied from the clock controller 62 can operate in synchronization with the clock CLK having the default frequency.

In Step S15-2, the power detector circuit 65 supplies the determination signal indicating that the internal power supply 71 cannot provide the sufficient power to the CPU 63 to notify the CPU 63 that the internal power supply 71 cannot provide the sufficient power. In other words, the CPU 63, which operates in synchronization with the clock CLK having the default frequency, receives the determination signal from the power detector circuit 65 to recognize that the sufficient power is not supplied from the internal power supply 71, that is, that the power is supplied from the power supply circuit 68, and proceeds to Step S15-3.

In Step S15-3, the CPU 63, which has recognized that the power is supplied from the power supply circuit 68, instead of the internal power supply 71, supplies the control signal CTRL indicating that the frequency of the clock is to be set to the low frequency $f_2$ to the clock controller 62. The clock controller 62 controls the frequency of the clock CLK output from the clock generator 61 so as to be equal to the low frequency $f_2$, in accordance with the control signal CTRL supplied from the CPU 63, and the supplies the clock CLK having the frequency $f_2$ to the CPU 63.

In Step S14, the CPU 63 performs the data processing in synchronization with the clock CLK supplied from the clock controller 62, as described in Step S4 in FIG. 7.

In this case, the CPU 63 receives the power from the power supply circuit 68 to operate in synchronization with the clock CLK having the low frequency $f_2$, supplied from the clock controller 62, so that the data processing can be performed with reduced power consumption, although at low speed.

Also in the portable telephone 30 in FIG. 8, the high-speed data processing can be performed when the portable telephone 30 receives the power from the internal power supply 71, while the data processing can be performed with reduced power consumption, although at low speed, when the portable telephone 30 receives the power from the power supply circuit 68, as described above with reference to FIG. 6. Even when the internal power supply 71 cannot provide the sufficient power and the external circuit 42 in the portable telephone 30 cannot operate, the card functioning unit 41 can operate.

Since the power detector circuit 65 supplies the determination signal indicating whether the internal power supply 71 can provide the sufficient power to the CPU 63 in the portable telephone 30 in FIG. 8, the CPU 63 can determine whether the power is supplied from the power supply circuit 68 or the internal power supply 71 to perform a variety of processing in accordance with the determination result.

Figure 10:
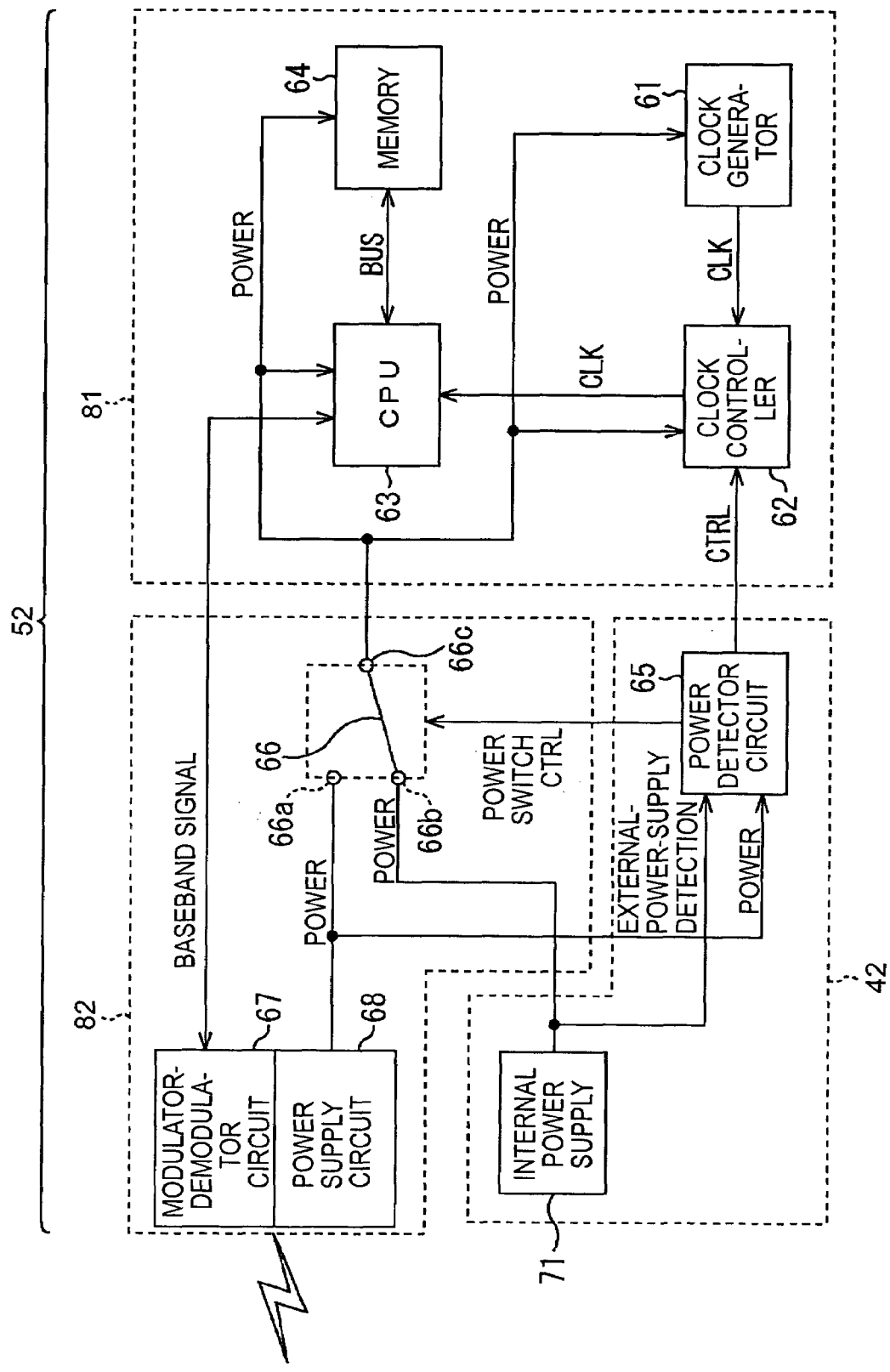
FIG. 10 is a block diagram showing in detail a third example of the structure of the portable telephone.

FIG. 10 is a block diagram showing in detail a third example of the structure of the portable telephone 30 in FIG. 2. The same reference numerals are used in FIG. 10 to identify the same components shown in FIG. 6. A detailed description of such components is omitted herein.

The portable telephone 30 in FIG. 10 basically has the same structure as in FIG. 6. However, the power detector circuit 65 is provided in the analog circuit unit 82 in the LSI 52 in FIG. 6, whereas the power detector circuit 65 is provided in the external circuit 42, instead of the LSI 52, in FIG. 10.

According to the embodiment shown in FIG. 10, for example, a power monitoring circuit in the external circuit 42 in the portable telephone 30 is used as the power detector circuit 65.

The external circuit 42 in the portable telephone 30 performs the processing similar to that in a portable telephone in the related art, as described above. The portable telephone in the related art generally has a power monitoring circuit for monitoring the state of the power supply (buttery) to display the remaining amount of the power supply.

Referring to FIG. 10, the power monitoring circuit adopted in the portable telephone in the related art is used as the power detector circuit 65 in the external circuit 42. In this case, the LSI 52 can be reduced in cost and size.

Since the operation of the portable telephone 30 in FIG. 10 is similar to that of the portable telephone 30 in FIG. 6, described above with reference to FIG. 7, a description is omitted herein.

Figure 11:
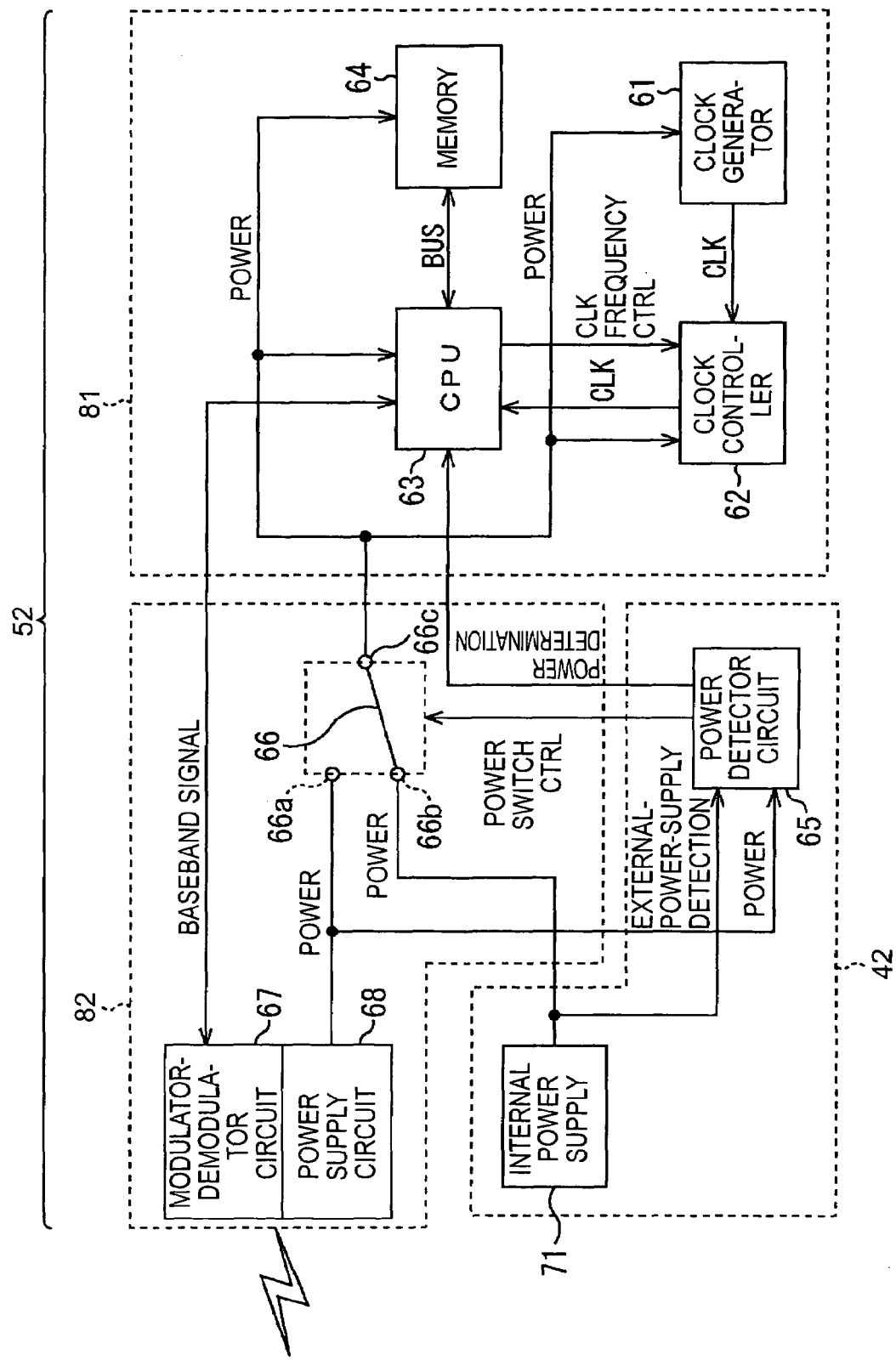
FIG. 11 is a block diagram showing in detail a fourth example of the structure of the portable telephone.

FIG. 11 is a block diagram showing in detail a fourth example of the structure of the portable telephone 30 in FIG. 2. The same reference numerals are used in FIG. 11 to identify the same components shown in FIG. 8. A detailed description of such components is omitted herein.

The portable telephone 30 in FIG. 11 basically has the same structure as in FIG. 8. However, the power detector circuit 65 is provided in the analog circuit unit 82 in the LSI 52 in FIG. 8, whereas the power detector circuit 65 is provided in the external circuit 42, instead of the LSI 52, in FIG. 11.

According to the embodiment shown in FIG. 11, for example, the power monitoring circuit in the external circuit 42 in the portable telephone 30 is used as the power detector circuit 65, as in the embodiment shown FIG. 10. Accordingly, the LSI 52 can be reduced in cost and size.

Since the operation of the portable telephone 30 in FIG. 11 is similar to that of the portable telephone 30 in FIG. 8, described above with reference to FIG. 9, a description is omitted herein.

Although the present invention is applied to the portable telephone 30 in the above embodiments, the present invention may be applied to a portable terminal device, such as an IC card including the internal power supply or a personal digital assistant (PDA).

The card functioning unit 41 including the LSI 52 (FIG. 3) is not limitedly applied to the automatic ticket gate system shown in FIG. 2. The card functioning unit 41 may be applied to payment of a charge in a shop, a reward card, a key for electronic lock, or another application.

Although the logic circuit unit 81 and the analog circuit unit 82 are provided in the LSI 52, which is one IC chip, according to above embodiments, the logic circuit unit 81 may be separated from the analog circuit unit 82 to form two IC chips.

Although the state of only the internal power supply 71 is determined by the power detector circuit 65 in the above embodiments, the state of the power supply circuit 68 may be determined by the power detector circuit 65. In the case of the CPU 63 that receives the power from the power supply circuit 68, for example, when the power detector circuit 65 determines that the power supply circuit 68 can provide sufficient power because the portable telephone 30 is sufficiently close to the R/W 21, the clock controller 62 can control the frequency of the clock CLK to be supplied to the CPU 63 so as to be equal to a frequency $f_4$ higher than the frequency $f_2$. For example, on the assumption that the inequality expression $f_1 > f_4 > f_2$ is established, controlling the frequency of the clock CLK to be supplied to the CPU 63 so as to be equal to the frequency $f_4$ in the clock controller 62 permits high-speed data processing to some extent even when the CPU 63 receives the power from the power supply circuit 68.

Although the frequency of the clock CLK to be supplied to the CPU 63 is set to the frequency $f_1$ or the frequency $f_2$ based on the determination of whether the CPU 63 receives the power from the internal power supply 71 or the power supply circuit 68 in the above embodiments, the frequency of the clock CLK to be supplied to the CPU 63 may be continuously controlled. In other words, the frequency of the clock CLK to be supplied to the CPU 63 may be continuously varied in accordance with, for example, the power (voltage or current) supplied from the internal power supply 71 or the power supply circuit 68 to the CPU 63. Specifically, the frequency of the clock CLK to be supplied to the CPU 63 may be controlled in the clock controller 62 in accordance with a function $g(x)$ where x denotes an argument of the voltage or current of the internal power supply 71 or the power supply circuit 68 and $g(x)$ denotes an increasing function taking on continuous positive values.

The clock generator 61 may generate a clock in synchronization with the radio signal transmitted from the R/W 21 or may use a crystal oscillator or a piezoelectric ceramic oscillator to generate a clock, independently of the radio signal transmitted from the R/W 21.

It should be understood by those skilled in the art that various modifications, combinations, sub-combinations and alterations may occur depending on design requirements and other factors insofar as they are within the scope of the appended claims or the equivalents thereof.

What is claimed is:

1. A data processing apparatus adapted to receive power to operate, the data processing apparatus comprising:
   clock generating means for generating a clock;
   data processing means for receiving the power from a first power supply or a second power supply to perform data processing in synchronization with the clock, wherein the first power supply supplies power caused by a radio signal transmitted from another data processing apparatus, and wherein the second power supply is an internal power supply for a portable communication terminal apparatus that is connected to the data processing apparatus; and
   clock controlling means for controlling the clock in accordance with the power supply from which the data processing means receives the power, wherein the clock controlling means controls the frequency of the clock to be a first frequency when the data processing means receives the power from the first power supply, and controls the frequency of the clock to be a second frequency higher than the first frequency when the data processing means receives the power from the second power supply.

2. The data processing apparatus according to claim 1, further comprising:
   selecting means for selecting the first or the second power supply to supply the power to the data processing means.

3. The data processing apparatus according to claim 2, further comprising:
   power detecting means for determining the state of the second power supply and controlling supply of the power to the data processing means in accordance with the determination result,
   wherein the selecting means selects the first or second power supply in accordance with the control of the supply of the power to the data processing means by the power detecting means.

4. The data processing apparatus according to claim 1, further comprising:
   power detecting means for determining the state of the second power supply and controlling supply of the power to the data processing means in accordance with the determination result,
   wherein the clock controlling means controls the clock in accordance with the control of the supply of the power to the data processing means by the power detecting means.

5. The data processing apparatus according to claim 1, wherein the data processing means controls the clock controlling means in accordance with the power supply from which the power is supplied to the data processing means, and wherein the clock controlling means controls the clock in accordance with the control by the data processing means.

6. The data processing apparatus according to claim 5, further comprising:
   power detecting means for determining the state of the second power supply and controlling supply of the power to the data processing means in accordance with the determination result,
   wherein the data processing means controls the clock controlling means in accordance with the control of the supply of the power to the data processing means by the power detecting means, and
   wherein the clock controlling means controls the clock in accordance with the control by the data processing means.

7. The data processing apparatus according to claim 1, wherein the data processing apparatus includes one IC chip or two IC chips corresponding to an analog unit and a logic unit, respectively.

8. A portable communication terminal apparatus comprising:
   a data processing unit; and
   an external circuit,
   wherein the data processing unit includes clock generating means for generating a clock;
   data processing means for receiving the power from a first power supply or a second power supply, to perform data processing in synchronization with the clock, wherein the first power supply supplies power caused by a radio signal transmitted from another data processing apparatus, and wherein the second power supply is an internal power supply for a portable communication terminal apparatus that is connected to the data processing apparatus; and clock controlling means for controlling the clock in accordance with the power supply from which the data processing means receives the power, wherein the clock controlling means controls the frequency of the clock to be a first frequency when the data processing means receives the power from the first power supply, and controls the frequency of the clock to be a second frequency higher than the first frequency when the data processing means receives the power from the second power supply, and wherein the external circuit includes at least the internal power supply.

9. The portable communication terminal apparatus according to claim 8, wherein the external circuit further includes power detecting means for determining the state of the second power supply and controlling supply of the power to the data processing means in accordance with the determination result.

10. A data processing method used in a data processing apparatus adapted to receive power to operate, the data processing apparatus including clock generating means for generating a clock; data processing means for receiving the power from a first power supply or a second power supply, to perform data processing in synchronization with the clock, wherein the first power supply supplies power caused by a radio signal transmitted from another data processinn apparatus, and wherein the second power supply is an internal power supply for a portable communication terminal apparatus that is connected to the data processing apparatus; and clock controlling means for controlling the clock in accordance with the power supply from which the data processing means receives the power, the data processing method comprising the steps of:

controlling the clock in accordance with the power supply from which the data processing means receives the power, in the clock controlling means, wherein the clock is controlled such that the frequency of the clock is a first frequency when the data processing means receives the power from the first power supply, and the frequency of the clock is a second frequency higher than the first frequency when the data processing means receives the power from the second power supply; and receiving the power from the first or second power supply to perform the data processing in synchronization with the clock, in the data processing means.

11. A data processing apparatus adapted to receive power to operate, the data processing apparatus comprising:

a clock generator generating a clock;

a data processor receiving the power from a first power supply or a second power supply, to perform data processing in synchronization with the clock, wherein the first power supply supplies power caused by a radio signal transmitted from another data processing apparatus, and wherein the second power supply is an internal power supply for a portable communication terminal apparatus that is connected to the data processing apparatus; and a clock controller controlling the clock in accordance with the power supply from which the data processing means receives the power, wherein the clock is controlled such that the frequency of the clock is a first frequency when the data processing means receives the power from the first power supply, and the frequency of the clock is a second frequency higher than the first frequency when the data processing means receives the power from the second power supply.

12. A portable communication terminal apparatus comprising:

a data processing unit; and an external circuit, wherein the data processing unit includes a clock generator generating a clock;

a data processor receiving the power from a first power supply or a second power supply to perform data processing in synchronization with the clock, wherein the first power supply supplies power caused by a radio signal transmitted from another data processmnn apparatus, and wherein the second power supply is an internal power supply for a portable communication terminal apparatus that is connected to the data processinn apparatus; and a clock controller controlling the clock in accordance with the power supply from which the data processing means receives the power, wherein the clock is controlled such that the frequency of the clock is a first frequency when the data processing means receives the power from the first power supply, and the frequency of the clock is a second frequency higher than the first frequency when the data processing means receives the power from the second power supply, and wherein the external circuit includes at least the internal power supply.

* * * * *

UNITED STATES PATENT AND TRADEMARK OFFICE
CERTIFICATE OF CORRECTION

PATENT NO.         : 7,296,742 B2                                          Page 1 of 1
APPLICATION NO.    : 11/155499
DATED              : November 20, 2007
INVENTOR(S)        : Kazuyoshi Enomoto et al.

It is certified that error appears in the above-identified patent and that said Letters Patent is hereby corrected as shown below:

Column 22, Line 32 Claim 12:
"processmnm" should read -- processing --.

Column 22, Lines 35-36 Claim 12:
"processinn" should read -- processing --.

Signed and Sealed this

Thirteenth Day of May, 2008

JON W. DUDAS
*Director of the United States Patent and Trademark Office*